(12) United States Patent
Razdan et al.

(10) Patent No.: US 7,724,743 B2
(45) Date of Patent: *May 25, 2010

(54) SYSTEM AND METHOD FOR DISTRIBUTING VOIP DATA PACKETS IN GROUP COMMUNICATIONS AMOUNG WIRELESS TELECOMMUNICATION DEVICES

(75) Inventors: Ashu Razdan, San Diego, CA (US); Arul Ananthanarayanan, San Diego, CA (US); Eric C. Rosen, Solana Beach, CA (US); Harleen K. Gill, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 1053 days.

This patent is subject to a terminal disclaimer.

(21) Appl. No.: 11/097,044

(22) Filed: Mar. 31, 2005

(65) Prior Publication Data
US 2006/0221968 A1 Oct. 5, 2006

(51) Int. Cl.
*H04L 12/66* (2006.01)
(52) U.S. Cl. .................. 370/392; 455/518
(58) Field of Classification Search ........... 370/312, 370/328, 338, 260, 352, 542; 455/519, 452, 455/518, 502
See application file for complete search history.

(56) References Cited

U.S. PATENT DOCUMENTS

| 5,038,399 | A | 8/1991 | Bruckert |
| 6,128,472 | A | 10/2000 | Harel et al. |
| 6,163,700 | A | 12/2000 | Hussain et al. |
| 6,366,914 | B1 * | 4/2002 | Stern ................. 707/10 |
| 6,370,142 | B1 | 4/2002 | Pitcher et al. |
| 6,477,149 | B1 | 11/2002 | Okanoue |
| 6,798,755 | B2 * | 9/2004 | Lillie et al. ............ 370/312 |
| 7,003,292 | B2 * | 2/2006 | Toyryla ............. 455/426.1 |
| 7,031,736 | B2 * | 4/2006 | Le et al. ............. 455/502 |
| 7,170,863 | B1 * | 1/2007 | Denman et al. ......... 370/260 |

(Continued)

FOREIGN PATENT DOCUMENTS

RU 2073913 2/1997

(Continued)

OTHER PUBLICATIONS

International Serach Report—PCT/US06/011746—ISA/US—May 8, 2007.

(Continued)

*Primary Examiner*—Thong H Vu
(74) *Attorney, Agent, or Firm*—Raphael Freiwirth

(57) ABSTRACT

In group wireless telecommunication, such as push-to-talk (PTT) calls, a voice communication is broadcast through Internet protocol data packets to other member devices of the PTT group. At least one communication server receives a single communication stream from a communicating wireless device, such as a PTT call, and creates a group communication to all wireless telecommunication devices of the designated group with the broadcast of Internet protocol data packets containing the voice data of the communication stream to one or more wireless telecommunication devices of the receiving group that can receive and handle the packets. Other wireless network infrastructure can be used to assist the communication server in generation and broadcast of the Internet protocol data packets to the receiving wireless telecommunication devices.

38 Claims, 6 Drawing Sheets

U.S. PATENT DOCUMENTS

| | | | |
|---|---|---|---|
| 7,200,390 B1* | 4/2007 | Henager et al. | 455/419 |
| 7,200,396 B2* | 4/2007 | Kauppinen | 455/435.3 |
| 7,386,000 B2* | 6/2008 | Lopponen et al. | 370/433 |
| 7,444,139 B1* | 10/2008 | Welch et al. | 455/416 |
| 2002/0012364 A1* | 1/2002 | Kalian et al. | 370/516 |
| 2002/0191572 A1* | 12/2002 | Weinstein et al. | 370/338 |
| 2003/0058827 A1 | 3/2003 | Chow et al. | |
| 2003/0148779 A1* | 8/2003 | Aravamudan et al. | 455/519 |
| 2004/0095900 A1* | 5/2004 | Siegel | 370/328 |
| 2004/0192364 A1 | 9/2004 | Ranalli et al. | |
| 2004/0198371 A1* | 10/2004 | Balasubramanian et al. | 455/452.2 |
| 2004/0202117 A1 | 10/2004 | Wilson et al. | |
| 2004/0215718 A1* | 10/2004 | Kazmi et al. | 709/203 |
| 2005/0124365 A1* | 6/2005 | Balasuriya et al. | 455/518 |
| 2005/0288047 A1* | 12/2005 | Ananthanarayanan et al. | 455/518 |
| 2005/0288049 A1* | 12/2005 | Gill et al. | 455/518 |
| 2006/0003784 A1* | 1/2006 | Chion et al. | 455/518 |
| 2006/0025149 A1* | 2/2006 | Karaoguz et al. | 455/452.2 |
| 2006/0073795 A1* | 4/2006 | Mayblum et al. | 455/90.2 |
| 2006/0168640 A1* | 7/2006 | Anttila et al. | 725/135 |
| 2006/0182152 A1* | 8/2006 | Bi et al. | 370/542 |
| 2006/0221933 A1* | 10/2006 | Bauer et al. | 370/352 |
| 2008/0239996 A1* | 10/2008 | Lohmar et al. | 370/261 |

FOREIGN PATENT DOCUMENTS

| | | |
|---|---|---|
| WO | 0013356 | 3/2000 |
| WO | 0219741 | 3/2002 |
| WO | 0251072 | 6/2002 |

OTHER PUBLICATIONS

Written Opinion—PCT/US06/011746—ISA/US—May 8, 2007.

Deering S: Stanford University; Network Working Group; "Host Extensions for IP Multicasting";May 1998; RFC 1054; pp. 10-15.

Deering S: "Host Extensions for IP Multicasting", Internet Specification RFC, XX, XX, No. 1112, Aug. 1, 1989, pp. 1-17.

W. Fenner, Xerox PARC; Network Working Group; "Internet Group Management Protocol", Version 2; The Internet Society, Nov. 1997; RFC 2236; pp. 1-24.

"Xylomenos G et al.: ""IP Multicasting for Wireless Mobile Hosts""", Military Communications Conference, Oct. 21, 1996, pp. 933-937".

* cited by examiner

SYSTEM AND METHOD FOR DISTRIBUTING VOIP DATA PACKETS IN GROUP COMMUNICATIONS AMOUNG WIRELESS TELECOMMUNICATION DEVICES

BACKGROUND OF THE INVENTION

1. Field of the Invention

The present invention generally relates to data networks and voice-over-internet protocol (VoIP) data packets. More specifically, the present invention relates to a system and method for efficiently distributing VoIP media to very large and/or geographically dense ad-hoc dispatch calls, such as Push-to-Talk group communications, in a wireless telecommunication network.

2. Description of the Related Art

In a wireless network, the users of wireless communication devices communicate over an air-interface to a central computer. This may be done directly, as in the case of a wireless LAN in an office environment, or it may be done through cellular infrastructure equipment, as in the case of a wireless telephone application. One type of personal communication system is a push-to-talk (PTT) system. A PTT communication connection is typically initiated by a single button-push on the wireless device that activates a half-duplex link between the speaker and each member device of the group and once the button is released, the device can receive incoming PTT transmissions once the button is released. In some arrangements, the PTT speaker will have the "floor" where no other group member can speak while the speaker is speaking. Once the speaker releases the PTT button, any other individual member of the group can engage their PTT button and they will have the floor. A specific PTT group of recipient devices for the communicating wireless device is commonly set up by the carrier and the wireless devices themselves do not allow the modification of the group, i.e. to include or drop individuals from the group, or to purposely direct a communication to be received by any fewer members than the entire group.

The typical PTT call involves two users who are rarely located within the same telecommunication sector such that communication and replication of the communication is propagated easily over the existing telecommunication infrastructure. However, a small but very important fraction of push-to-talk calls involve a larger number of call participants, some of whom may also be located within the same sector; public-safety disaster scenarios are one example. In such scenario, the maintenance of the PTT communications within the group all located on the same telecommunication resource is difficult and inefficient. These systems will use "trunks" of the telephone network and standard channel allocation that devote individual circuits for each call participant, thus limiting system scalability.

In existing "wired" networks, it is known to use a "broadcast" of data over a broadcast channel such that data is sent to all potential receivers and the receiver can determine whether or not the broadcast media applies to it. Applications such as LAN TV, desktop conferencing, corporate broadcasts, and collaborative computing, require data transmission in a "point-to-multipoint" fashion, which is, transmitting data to multiple recipients simultaneously. Such applications would require a tremendous amount of network bandwidth to be effectively implemented using the point-to-point technique. For example, using a traditional point-to-point transmission scheme would require the same information to be transmitted n times, where n represents the number of recipients. The bandwidth required to accomplish such a task would grow in proportion to the number of computers receiving the transmission. Such an approach is infeasible for applications where large data transmissions, such as audio and video, need to be sent to a large number of recipients. To effectively implement the transfer of large quantities of data in a point-to-multipoint network, a broadcast design is used wherein data is broken into packets, each packet addressed to a "broadcast address," rather than addressing multiple copies of each packet to each recipient desiring the information. However, the network must generally send the information packets throughout the entire network so that anyone desiring reception of the information can "listen" to the broadcast address and receive the information. Thus, the raw propagation of broadcasting packets everywhere is a significant use of network resources if only a small group of recipients desire the information.

To overcome this problem, a technique known as Internet Protocol (IP) multicast has been developed for use in wired IP networks. With IP multicasting, applications can send one copy of each data packet and address it to a group of recipients that wish to receive the information generated by an application. This technique addresses data packets to a group of recipients rather than to individual recipients, and it relies on the network to forward the data packets only to "paths" that have a sub-network that needs the information, i.e., a sub-network having at least one recipient desiring the particular IP multicast. One example of a subnetwork is a local broadcast network, such as an Ethernet LAN.

It is known to encapsulate voice data within IP data packets, this method commonly referred to as "VoIP". In common Ethernet wireless networks, such as an IEEE Standard 802.11 (b) network, the network allows for wholesale broadcasting of IP packets. However, within the constraints of wireless networks, it would be desirable to limit multicast transmissions to a specific geographic area having at least one receiving user desiring reception because of the disadvantage of flooding the wireless network with packets. Presently, in order to transmit an IP multicast transmission in a wireless network, the transmission must be sent to all end devices, regardless of whether or not the multicast transmission is desired, which burdens all resources of the PTT group whether or not the receiving device is able to receive VoIP packets. Moreover, such efficient broadcasting of VoIP packets would allow a very geographically dense group of PTT devices to communicate despite the limited telecommunication resources. It is thus to such a system and method of efficiently broadcasting voice data packets to the wireless telecommunication devices of a PTT communication group that the present invention is primarily directed.

SUMMARY OF THE INVENTION

In group-direct wireless telecommunications such as push-to-talk (PTT) calls, a PTT voice communication is efficiently broadcast through Internet protocol data packets to other member devices of the PTT group. At least one communication server receives a single communication stream from a communicating wireless device, such as a PTT voice call, and creates a group communication to all wireless telecommunication devices of the designated group, with the broadcast of Internet protocol data packets (VoIP) containing the voice data of the communication stream to the wireless telecommunication devices of the receiving group that can receive and handle the packets, and otherwise sends the group communication via the standard telecommunication infrastructure. The communication server preferably utilizes the wireless network infrastructure to assist in generation and broadcast of the VoIP packets to the various wireless telecommunication devices.

The system for broadcasting VoIP packets containing voice data to a group of wireless telecommunication devices includes a plurality of wireless telecommunication devices wherein each wireless telecommunication device is able to direct a single communication stream to a designated group of the plurality of wireless telecommunication devices, such as a PTT group, and at least one of the plurality of wireless telecommunication devices able to receive broadcast VoIP packets containing voice data. Also, the system includes a communication server that receives the single communication stream from a communicating wireless device and creates a group communication to all wireless telecommunication devices of the designated group, and causes the broadcast of VoIP packets to at least one wireless telecommunication device of the receiving group of the plurality of wireless telecommunication devices.

The method for efficiently distributing VoIP packets containing voice data among a group of wireless telecommunication devices on a wireless network, comprising the steps of: directing a single communication stream from a wireless telecommunication device to a designated group of a plurality of wireless telecommunication devices on a wireless network, the communication stream including voice data with at least one of the plurality of wireless telecommunication devices able to receive VoIP packets containing voice data, receiving the single communication stream from a communicating wireless device at a communication server, creating at the communication server a group communication to all wireless telecommunication devices of the designated group; and broadcasting VoIP packets to the wireless telecommunication device(s) of the receiving group of the plurality of wireless telecommunication devices.

The system and method can therefore allow efficient broadcast of VoIP packets without flooding the wireless network with packets as it limits multicast transmissions to a specific geographic area having at least one capable receiving wireless telecommunication device. Thus, the system and method can use VoIP packets to conduct group communications within a very geographically-dense group of PTT devices without overburdening the wireless telecommunication resources, e.g. not having to use trunked telecommunication channels for each wireless device. The system and method can accordingly be implemented with non VoIP capable device in the same PTT group.

Objects, advantages, and features of the present invention will become apparent after review of the hereinafter set forth Brief Description of the Drawings, Detailed Description of the Invention, and the claims.

DETAILED DESCRIPTION OF THE INVENTION

Figure 1:
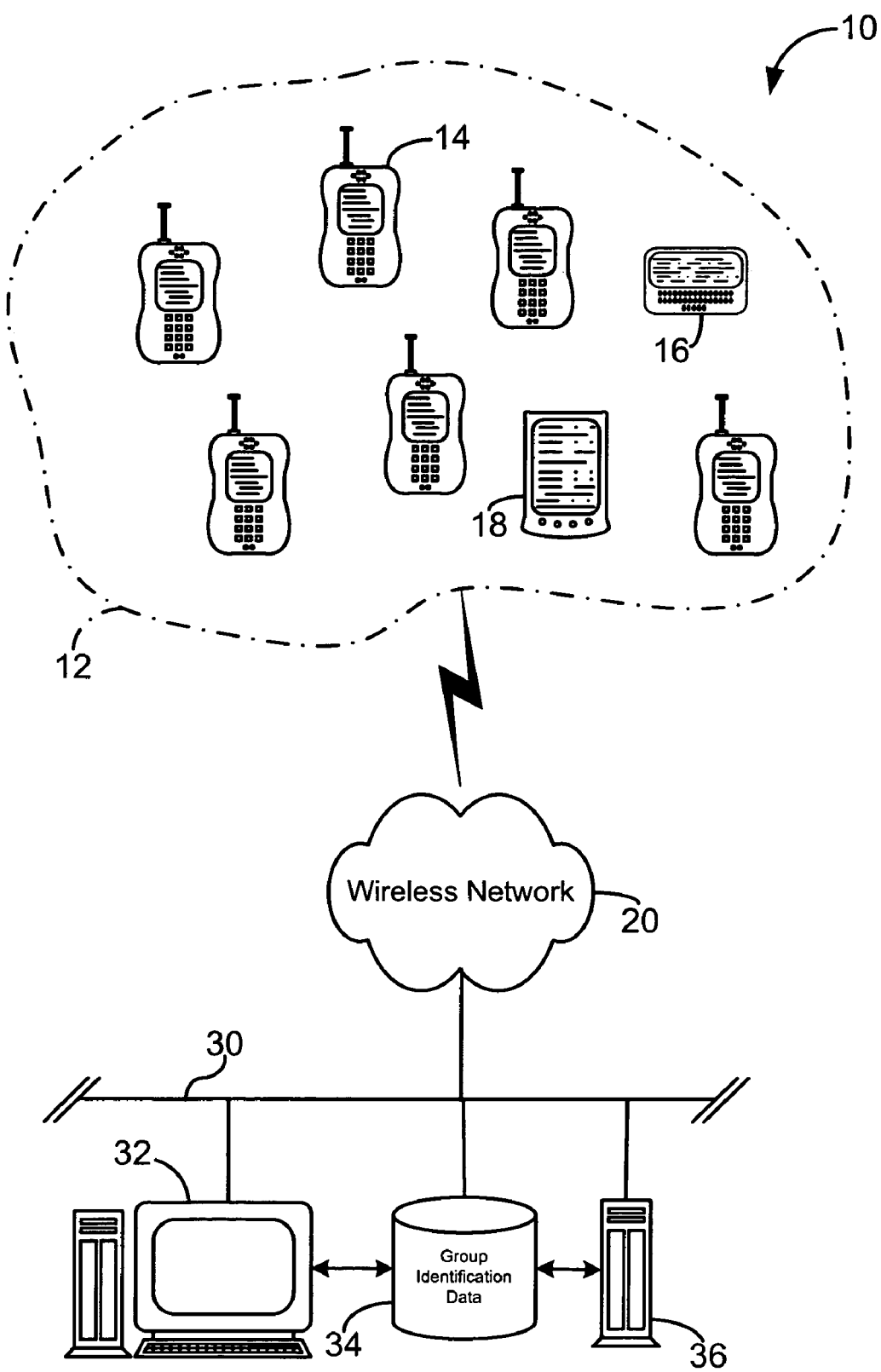
FIG. 1 is a representative diagram of a wireless network with a designated PTT group of wireless telecommunication devices communicating with a group communication server and other computer devices across the wireless network.

With reference to the figures in which like numerals represent like elements throughout, FIG. 1 illustrates the system 10 for broadcasting Internet protocol data packets containing voice data to a group of wireless telecommunication devices (target set 12) on a wireless network 20. Here, the one or more wireless telecommunication devices are in a PTT group, such as the wireless telephone 14, smart pager 16 and personal digital assistant (PDA) 18, with other wireless telecommunication devices across a wireless network 20. In the system 10, each wireless telecommunication device 14,16,18 is capable of selectively directly communicating across the wireless communication network 20 with a target set 12 of one or more other wireless telecommunication devices with the plurality. For example, the target set for cellular telephone 14 can all devices in the target set 12 or a subset thereof, such as pager 16 and PDA 18.

In particular, the system 10 leverages the use of IP multicasting within a wireless operator's private wireless network 30 and supporting infrastructure to efficiently deliver VoIP based media for very large push-to-talk (or other similar services) calls defined in ad-hoc fashion. These PTT calls can involve a very large number of call participants (several hundred) who can be scattered across an operator's wireless network 20 or who may all be located in a small number of sectors on the same network resources.

In one embodiment, a group communication server 32 selectively receives requests to bridge direct communications between the communicating wireless telecommunication devices 14,16,18 and the one or more other wireless telecommunication devices in the target set 12 designated for the communicating wireless telecommunication device. The communication server 32 then selectively bridges the requested direct communication, such as a PTT voice communication. The identity of the target set 12 is selectively available to the group communication server 32, such as being resident on the group communication server 32 or in a connected database 34, or possibly on another computer device, such as packet flow-control server 36 (as is common in network infrastructure).

The system 10 therefore includes a plurality of wireless telecommunication devices (target set 12) wherein each wireless telecommunication device is able to direct a single communication stream to a designated group (target set 12) of the plurality of wireless telecommunication devices 14,16,18, and at least one of the plurality of wireless telecommunication devices is able to receive broadcast Internet protocol data (VoIP) packets. The communication server 32 that receives the single communication stream from a communicating wireless device (such as wireless telephone 14) and creates a group communication to all wireless telecommunication devices of the designated group, such as PTT call. The communication server 32 causes the broadcast of Internet protocol data packets containing voice data to at least one wireless telecommunication device of the target set 12, either directly or through the use of other computer devices on the wireless network 20 or on the server-side LAN 30. The group communication server 32 can have an attached or accessible database 34 to store the group identification data for the wireless devices that another server 36 controls group communications for. It should be appreciated that the number of computer components resident on server-side LAN 30, or across the wireless network 20, or Internet generally, are not limited.

In such configuration, the communication server 32 can broadcast only standard voice data packets, such as in CDMA, with other resources receiving the CDMA packets and creating VoIP packets, or other methods of packetizing data may be used as known in the art. Further, the PTT communication broadcast can be voice data, application data, multimedia, or any form of computer data. In another embodiment, the wireless telecommunication device, such as wireless telephone 14, can itself send Internet protocol data packets to the communication server 32.

Figure 2:
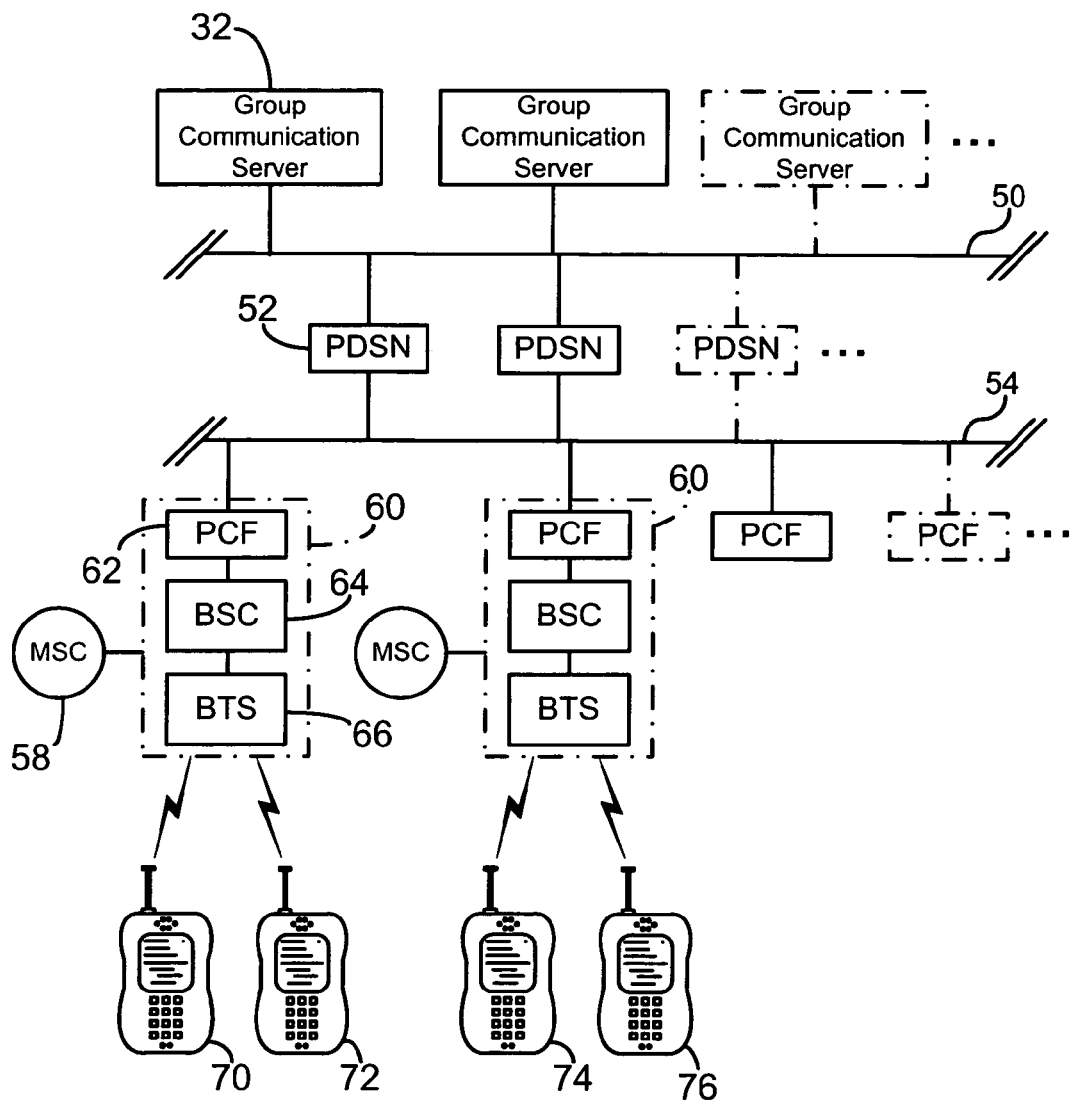
FIG. 2 is a representative diagram of one embodiment of a wireless network in a common cellular telecommunication configuration, having a series of group communication servers control communications between the wireless telecommunication devices of PTT group members.

There are typically one or more intermediate communication devices that bridge communication streams between the communication server 32 and the group of wireless telecommunication devices 12, as is shown in FIG. 2, and the communication server 32 can further determine which member wireless telecommunication devices are able to receive broadcast Internet data protocol packets, as is more fully described below. The communication server 32 will then direct the one or more intermediate communication devices to send Internet protocol data packets to those wireless telecommunication devices of the group that can receive Internet protocol data packets.

FIG. 2 is a representative diagram of one embodiment of a wireless network in a common cellular telecommunication configuration, having a group communication server 32 control communications between the wireless devices of set group members (devices 70,72,74,76) in a PTT system. The wireless network is merely exemplary and can include any system whereby remote modules communicate over-the-air between and among each other and/or between and among components of a wireless network 20, including, without limitation, wireless network carriers and/or servers. A series of group communication servers 32 are connected to a group communication server LAN 50. Wireless telephones can request packet data sessions (such as CDMA) from the group communication server(s) 32 using a data service option.

The group communication server(s) 32 are connected to a wireless service providers packet data service node (PDSN) such as PSDN 52, shown here resident on a carrier network 54. Each PSDN 52 can interface with a base station controller 64 of a base station 60 through a packet control function (PCF) 62. The PCF 62 is typically located in the base station 60. The carrier network 54 controls messages (generally in the form of data packets) sent to a messaging service controller ("MSC") 58. The carrier network 30 communicates with the MSC 32 by a network, the Internet and/or POTS ("plain ordinary telephone system"). Typically, the network or Internet connection between the carrier network 54 and the MSC 58 transfers data, and the POTS transfers voice information. The MSC 58 can be connected to one or more base stations 60. In a similar manner to the carrier network, the MSC 58 is typically connected to the branch-to-source (BTS) 66 by both the network and/or Internet for data transfer and POTS for voice information. The BTS 66 ultimately broadcasts and receives messages wirelessly to and from the wireless devices, such as cellular telephones 70,72,74,76, by short messaging service ("SMS"), or other over-the-air methods known in the art.

Cellular telephones and telecommunication devices, such as wireless telephone 14, are being manufactured with increased computing capabilities and are becoming tantamount to personal computers and hand-held PDAs. These "smart" cellular telephones allow software developers to create software applications that are downloadable and executable on the processor of the wireless device. The wireless device, such as cellular telephone 14, can download many types of applications, such as web pages, applets, MIDlets, games and stock monitors, or simply data such as news and sports-related data. In wireless devices that have designated a set 12 of group members, the wireless device can directly connect with the other member of the set and engage in voice and data communication. However, all such direct communications will occur through, or at the control of, the group communication server 32. All data packets of the devices do not necessarily have to travel through the group communication server 32 itself, but the server 32 must be able to ultimately control the communication because it will typically be the only server-side LAN 30 component that is aware of and/or can retrieve the identity of the members of the set 12, or direct the identity of the members of the set 12 to another computer device.

Figure 3:
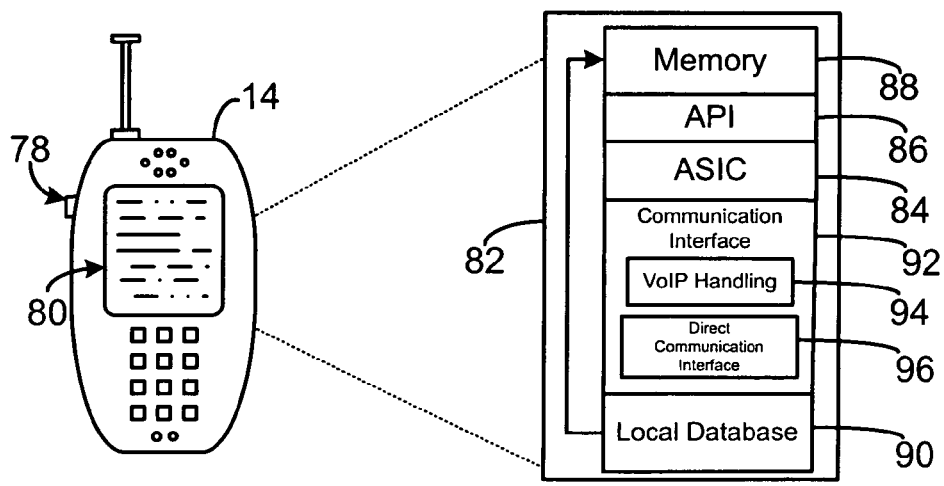
FIG. 3 is a block diagram illustrating the computer platform of the wireless telecommunication device with PTT capability and VoIP reception capability.

FIG. 3 is a block diagram illustrating one embodiment of the wireless telecommunication device being a cellular telephone 14 with a PTT button 78 that opens the direct communication to the target set 12 of devices. The wireless device 14 is also shown as having a graphics display 80 to the user of the wireless device 14. The wireless device 14 includes a computer platform 82 that can handle voice and data packets, and receive and execute software applications transmitted across the wireless network 20. The computer platform 80 includes, among other components, an application-specific integrated circuit ("ASIC") 84, or other processor, microprocessor, logic circuit, programmable gate array, or other data processing device. The ASIC 84 is installed at the time of manufacture of the wireless device and is not normally upgradeable. The ASIC 84 or other processor executes an application programming interface ("API") layer 86, which includes the resident application environment, and can include the operating system loaded on the ASIC 84. The resident application environment interfaces with any resident programs in the memory 88 of the wireless device. An example of a resident application environment is the "binary runtime environment for wireless" (BREW) software developed by Qualcomm® for wireless device platforms.

As shown here, the wireless device can be a cellular telephone 14, with a graphics display, but can also be any wireless device with a computer platform as known in the art, such as a personal digital assistant (PDA), a pager with a graphics display, or even a separate computer platform that has a wireless communication portal, and may otherwise have a wired connection to a network or the Internet. Further, the memory 88 can be comprised of read-only or random-access memory (RAM and ROM), EPROM, EEPROM, flash cards, or any memory common to computer platforms. The computer platform 82 can also include a local database 90 for storage of software applications not actively used in memory 88. The local database 90 is typically comprised of one or more flash memory cells, but can be any secondary or tertiary storage device as known in the art, such as magnetic media, EPROM, EEPROM, optical media, tape, or soft or hard disk.

The wireless telephone typically will open a full duplex channel for telecommunication, and in some instances, will communicate via a half-duplex channel, only being able to talk or receive a voice stream.

In this embodiment of the wireless device 14, the computer platform 82 also includes a communication interface 92 that includes a direct communication interface 94 that can open the direct communication channel from the wireless device. The direct communication interface 92 can also be part of the standard communication interface for the wireless device which ordinarily carries the voice and data transmitted to and from the wireless device. The direct communication interface 92 typically is comprised of hardware as is known in the art. The communication interface 92 further includes an IP packet handling interface 96 that can at least receive or receive and send VoIP over the wireless network 20. Alternately, the IP packet interface 96 can be attuned to a broadcast channel specifically designed for VoIP packet broadcast, and such channel is possibly outside the carrier channels of the wireless network 20. In such configuration, with a separate broadcast channel, the received PTT group communications would not use any of the standard carrier channels and thus lessen the load on the geographical sector resources needed to handle group communications.

Figure 4:
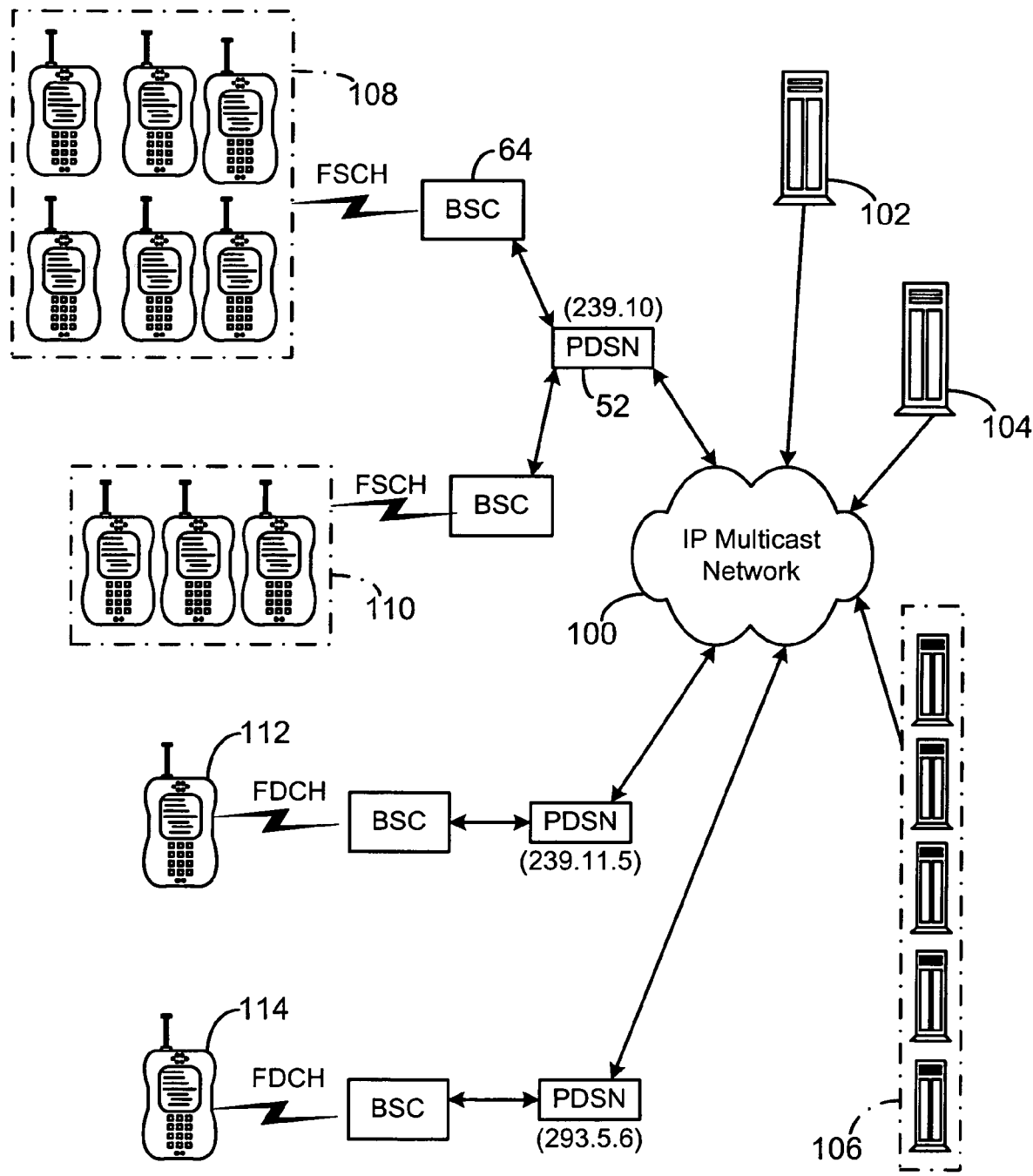
FIG. 4 is a diagram of one embodiment of multicast groups for PTT communications across a traditional cellular infrastructure.

FIG. 4 is a diagram of one embodiment of multicast groups for PIT communications across a traditional cellular infrastructure. The wireless operator identifies a class of multicast groups addresses to devote PTT groups and thus create a IP Multicast Network 100. A location server 104 and dispatcher 104 are supported by multiple communication servers 106 to set up the multicasting channels across the network. The wireless operator's PTT location server 102 is configured to identify how to map any unicast IP address assigned to a wireless device, such as one wireless device in group 108, group 110 or single wireless devices 112 and 114, to a given PDSN 52 identifier. The PDSN 52 identified by the location server 102 is the PDSN 52 to which unicast traffic destined to the wireless telecommunication device will be routed. Each PDSN 52 is configured to statically maintain itself as a member in a subset of the multicast groups identified for providing efficient PTT services for very large ad-hoc groups. The mapping of multicast groups to the PDSNs 52 is defined based on the expected distribution of very large PTT communications within an operator's network In current embodiments, a PTT system provides point-to-multipoint voice service over commercial cellular infrastructure, such as CDMA, TDMA, GSM. Communication between endpoints takes place within virtual groups using a dispatch model wherein the voice of one talker is broadcasted to many listeners by the Dispatcher 104. In standard configuration, a PTT System relies on a Group Call Server (GCS) to replicate the media and setup point-to-point communication links with each endpoint. However, in a geographically dense area, setting up dedicated channels for each of the wireless telecommunication devices participating in the same call is not only inefficient, but can to cripple the capacity of a cellular sector.

The present system however can use Protocol Independent Multicast (PIM), which is a multicast routing protocol that runs over an existing unicast infrastructure. PIM provides for both dense and sparse group membership. It is different from other protocols, since PIM uses an explicit join model for sparse groups. Joining occurs on a shared tree and can switch to a per-source tree. Where bandwidth is plentiful and group membership is dense, overhead can be reduced by flooding data out all links and later pruning exception cases where there are no group members.

In propagating multicast VoIP packets, the proposed design uses a statically configured IP-multicast network 100 having distribution trees are configured in a fixed manner by making the PDSNs 52 join a set of pre-configured multicast groups 108,110,112,114 statically, as shown in FIG. 4. The PDSN's 52 can either send periodic join messages for each of the PTT groups they are interested in, or alternately, static entries can be made in all the intermediate multicast routers. Thus, each PDSN (statically) subscribes to a (potentially overlapping) subset of available Multicast groups. The size of the Multicast address space reserved per PDSN 52 should be large enough to handle the expected number of large groups within the PDSN's 52 geographical region.

Let G be a function mapping a PDSN 52 to the corresponding multicast groups it is interested in. That is, $G(PDSN_1)$ is the set of multicast groups $PDSN_1$ is a member of. G is a many-to-one mapping and G is known to the appropriate communication server 106. Let M be the function mapping between a wireless telecommunication device's IP address and the identifier of the PDSN 52 serving that wireless telecommunication device. For example, $M(IP_1)$ returns the identifier of the PDSN 52 serving a wireless telecommunication device with $IP_1$. This mapping is also known to the communication server 106, and can be deduced based on the knowledge of the set of IP addresses each of the PDSNs 52 can assign during a point-to-point (PPP) session. The communication servers 106 are consequently configured with a mapping between PTT group members and the serving PDSN 52 identifier.

In a call scenario using the above multicast mechanism, the Dispatcher 104 receives a PPT request from a originating wireless device, such as group device 114, and looks up the targets, say $t_1$ through $t_n$. The dispatcher uses the mapping M to identify the set of PDSNs 52—say $P_1$ through $P_m$ serving each of the target wireless telecommunication devices. It should be noted that $n \geq m$. The appropriate communication server 32 assigns calls to the Multicast group(s) dynamically based on where participants are, and PDSN 52 subscription during call setup. The communication server 106 then decides the following: Is this a large PTT group call (based on the parameter n)? Is this a dense PTT group call (based on the appropriate data for the targets, and potentially the maximum cardinality of the sets $M(P_i)$, or max $\{|M(P_i)|\}$).

The communication server 106 decides to use certain multicast group addresses based on the following criteria: If $G(P_1) \cap G(P_2) \cap \ldots G(P_m) \neq \kappa \phi$, use one of the group address belonging to this intersection that is currently not being used. If $G(P_1) \cap G(P_2) \cap \ldots G(P_m) = \kappa \phi$, use one unused multicast group address each from the sets $G(P_1), G(P_2), \ldots G(P_m)$. The Dispatcher 104 sends the selected multicast group address g from G(M(t)) for the target t to the communication server 106. The communication server 106 then receives the set of multicast group addresses chosen for the PTT communication.

In one embodiment, the 233.0.0.0/8 block has been set aside for multicast use for entities with their own autonomous system number (ASN). The 239.0.0.0/8 block is administratively scoped for internal use only (like the 192.168.0.0/16 block in the case of unicast). These two multicast address blocks can be used within the carrier's private network, allowing the communication server 106 to use multicast address space up to around 32 million.

Figure 5:
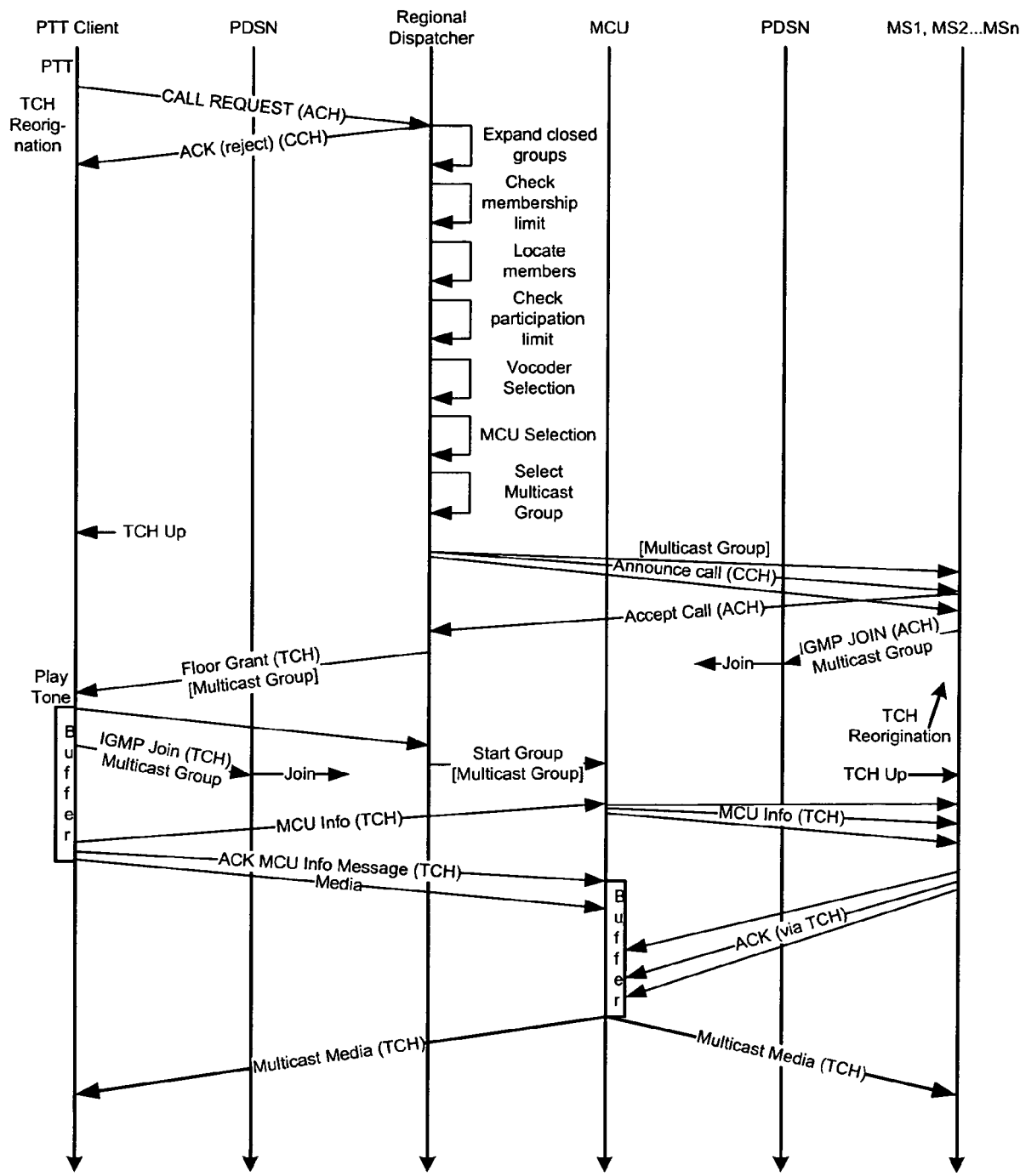
FIG. 5 is a call-progress diagram for a PTT communication being initiated using an IP multicast to PTT group members able to receive the IP data packets.

FIG. 5 is a call-progress diagram for a PTT communication being initiated using an IP multicast to PIT group members able to receive the IP data packets. In this embodiment, the "floor grant" or permission for the originating wireless telecommunication device is given after the PTT channel is verified as available and the multicast groups are selected. The existence of available PTT members for multicast can be determinative of the availability of the floor dependent upon the system configuration. For example, if the system determines that the PTT embers are geographically dense but multicast is not available, it can refuse the initial request or set up the standard PPP communications. It should be noted that call setup signaling can occur via a formal broadcast channel, as opposed to just a generic shared forward link channel such as the Control Channel. For example, in one extant telecommunications system, the system uses a Control Channel (CC) and a separate Broadcast Channel (BCH).

Figure 6:
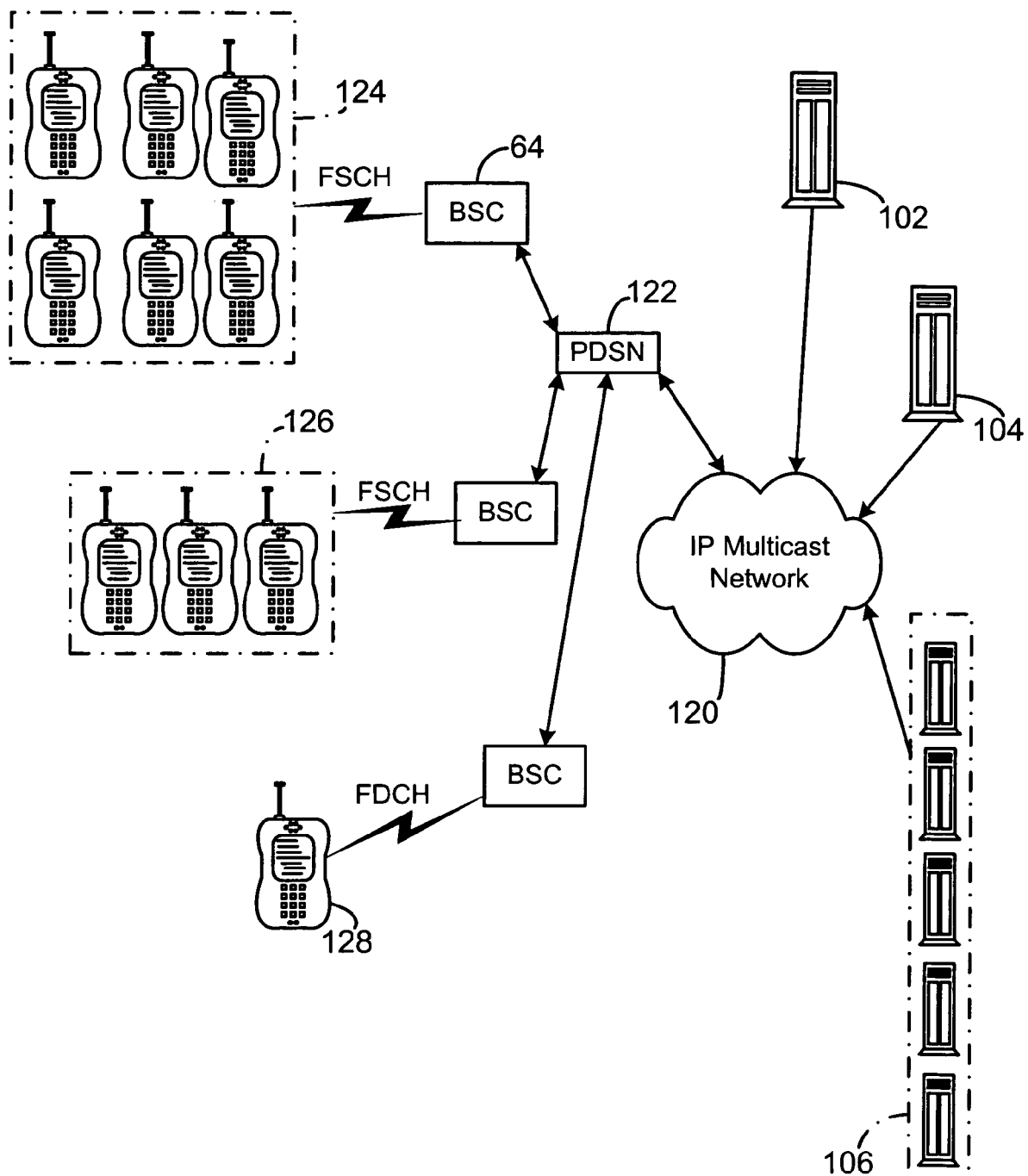
FIG. 6 is a diagram of another embodiment of multicast groups for PTT communications across a traditional cellular infrastructure using GRE Tunnels.

FIG. 6 is a diagram of another embodiment of multicast groups for PTT communications across a traditional cellular infrastructure using Generic Routing Encapsulation (GRE) Tunneling. GRE is a standards-based tunneling protocol known in the art that can encapsulate a wide variety of protocol packet types inside IP tunnels, creating a virtual point-to-point link over an IP network. GRE tunneling allows separate networks to appear to be directly connected. Here, traffic on the IP multicast network 120 is encapsulated in a GRE IP packet with a source and destination address that at least the communications servers 106 and the PDSN 122 recognize. Target group members 124, 126 and 128 typically do not need to recognize the GRE packets as the PDSN 122 has recreated the VoIP packets. Thus, all traffic can be transmitted across an extant wireless network without that network's infrastructure knowing anything about the sending and receiving networks. Such design is advantageous in that the carrier infrastructure is not required to support the actual multicasting. However, the PDSN 122 needs to have components set up to handle the GRE protocol so the modification of the PDSNs can be very expensive.

Figure 7:
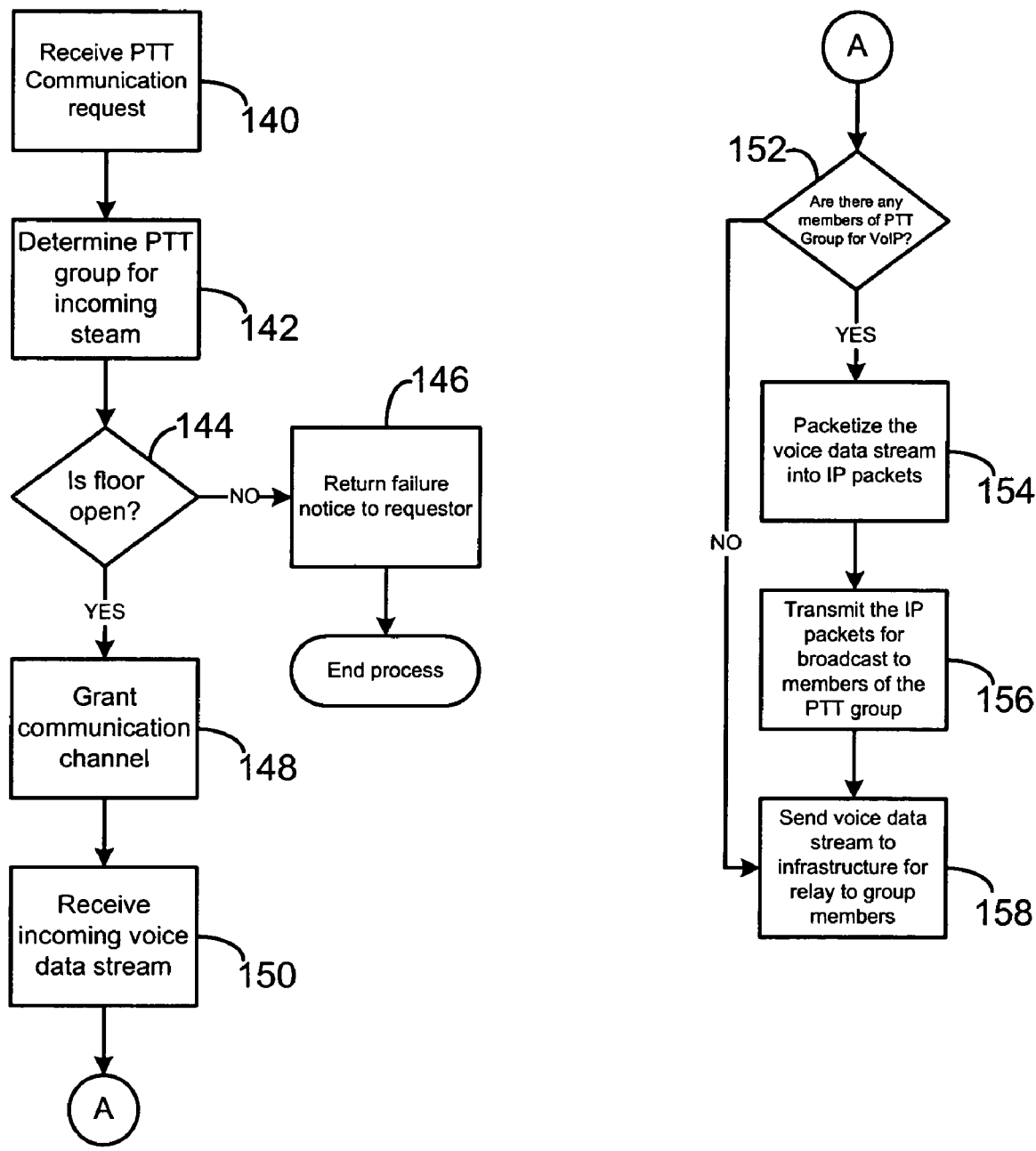
FIG. 7 is a flowchart of one embodiment of the process executing on the group communication server to direct VoIP packets to the appropriate wireless devices of a designated PTT group on the wireless network.

FIG. 7 is a flowchart of one embodiment of the process executing on the group communication server 32 to direct VoIP packets to the appropriate wireless devices of a designated PTT group on the wireless network. A PTT communication request is received at the communication server 32, as shown at step 140, and a PTT group is determined for the incoming communication stream, as shown at step 142. A decision is then made as to whether the "floor" is open, i.e. is the requesting PTT device able to direct a group communication, as shown at decision 144. If the floor is not open at decision 144, a failure notice is returned to the requesting wireless telecommunication device as shown at step 146, and the process ends.

If the floor is open to the requesting wireless telecommunication device at decision 144, then the communication channel is granted to the requesting wireless telecommunication device as shown at step 148 and the incoming voice stream is received, as shown at step 150. Then a decision is made as to whether there are any members of the PTT group that can receive VoIP, as shown at decision 152. If none of the PTT group members can receive VoIP packets, then the process forwards to step 158 wherein the voice data stream is sent to the extant infrastructure (such as cellular infrastructure) to the broadcast to the PTT group members.

If there are PTT group members that can receive VoIP at decision 152, the voice data stream is packetized into IP data packets, as shown at step 154, and then the VoIP packets are transmitted (such as to the PDSN 52) for ultimate broadcast to the members of the PTT group, as shown at step 156. Then the remaining voice data stream is sent to the extant infrastructure for transmission to the PTT group members as shown at step 158. If the system is embodied with the communication server 32 controlling other computer devices to assist in packetizing or data relay, then such other steps will occur in the process as would be apparent to one of skill in the art.

It can thus be seen that the system 10 provides a method for efficiently distributing VoIP data packets among a group (target set 12) of wireless telecommunication devices on a wireless network 20 including the steps of directing a single communication stream from a wireless telecommunication device (such as wireless telephone 14) to a designated group of a plurality of wireless telecommunication devices (target set 12), with the communication stream including at least voice data. At least one of the plurality of wireless telecommunication devices is able to receive VoIP data packets, and thus the method further includes receiving the single communication stream from a communicating wireless device (wireless telephone 14) at a communication server 32, creating at a group communication to all wireless telecommunication devices of the designated group (target set 12), and broadcasting the VoIP data packets to at least the one wireless telecommunication device of the receiving group (target set 12).

The method can further include the step of receiving the VoIP data packets at one or more of the plurality of wireless telecommunication devices 14,16,18 in the group. The step of directing a communication stream can include directing application data, multimedia, or other computer media to a designated group, or target set 12, of a plurality of wireless telecommunication devices. The method can further include the step of routing the voice data from the communication server 32 to another computer device on the wireless network 20 or on the server-side LAN 30, that converts the voice data in VoIP data packets for broadcast to at least one wireless telecommunication device of the group (target set 12). The method can also include the steps of determining at the communication server 32 the member wireless telecommunication devices (such as devices 14,16,18) able to receive broadcast VoIP data packets, and directing one or more intermediate communication devices, such as PDSN 52, to send VoIP data packets to those wireless telecommunication devices of the group that can receive VoIP data packets, with the one or more intermediate communication devices bridging communication streams between the communication server 32 and the group (target set 12) of wireless telecommunication devices.

The system 10 also includes an inventive wireless telecommunication device (such as wireless telephone 14 shown in FIG. 3) able to direct a single communication stream to a designated group of a plurality of wireless telecommunication devices (target set 12) accessible on a wireless network 20, wherein the wireless telecommunication device is further able to receive broadcast VoIP data packets (such as through VoIP interface 96) in addition communicating through a standard communication stream on the wireless network 20 to other wireless telecommunication devices on the wireless network 20, such as through communication interface 92.

Another embodiment includes a program resident in a computer readable medium, where the program directs a wireless device having a computer platform to perform the inventive steps of the method. The computer readable medium can be the memory 88 of the computer platform 82 of the wireless telephone 14, or other wireless device, or can be in a local database, such as local database 90 of the wireless telephone 14. Further, the computer readable medium can be in a secondary storage media that is loadable onto a wireless device computer platform, such as a magnetic disk or tape, optical disk, hard disk, flash memory, or other storage media as is known in the art.

In the context of FIG. 7, the method may be implemented, for example, by operating portion(s) of the wireless network 20 to execute a sequence of machine-readable instructions, such as wireless platform 82 and the communication server 32. The instructions can reside in various types of signal-bearing or data storage primary, secondary, or tertiary media. The media may comprise, for example, RAM (not shown) accessible by, or residing within, the components of the wireless network 20. Whether contained in RAM, a diskette, or other secondary storage media, the instructions may be stored on a variety of machine-readable data storage media, such as DASD storage (e.g., a conventional "hard drive" or a RAID array), magnetic tape, electronic read-only memory (e.g., ROM, EPROM, or EEPROM), flash memory cards, an optical storage device (e.g. CD-ROM, WORM, DVD, digital optical tape), paper "punch" cards, or other suitable data storage media including digital and analog transmission media.

While the foregoing disclosure shows illustrative embodiments of the invention, it should be noted that various changes and modifications could be made herein without departing from the scope of the invention as defined by the appended claims. Furthermore, although elements of the invention may be described or claimed in the singular, the plural is contemplated unless limitation to the singular is explicitly stated.

What is claimed is:

1. A system for broadcasting Internet protocol data packets containing voice data to a group of wireless telecommunication devices on a wireless network, comprising:
    a plurality of wireless telecommunication devices wherein each wireless telecommunication device is able to direct a single communication stream that is addressed to a communication server for transmission to a designated group of the plurality of wireless telecommunication devices, and at least one of the plurality of wireless telecommunication devices able to receive broadcast Internet protocol data packets containing voice data;
    the communication server that receives the single communication stream from a communicating wireless device and creates a group communication to all wireless telecommunication devices of the designated group, and wherein the server causes the broadcast of Internet protocol data packets containing voice data to at least one wireless telecommunication device of the receiving group of the plurality of wireless telecommunication devices; and
    one or more intermediate communication devices that bridge communication streams between the communication server and the group of wireless telecommunication devices,
    wherein the communication server further determines the wireless telecommunication devices of the group able to receive broadcast Internet data protocol packets and directs the one or more intermediate communication devices to send Internet protocol data packets to those wireless telecommunication devices of the group that can receive Internet protocol data packets.

2. The system of claim 1, wherein the communication server broadcasts voice data packets.

3. The system of claim 2, wherein the communication server broadcasts application data.

4. The system of claim 1, wherein the communication server broadcasts multimedia.

5. The system of claim 1, wherein at least one wireless telecommunication device sends Internet protocol data packets to the communication server.

6. The system of claim 1, wherein the wireless telecommunication device sends voice data to the communication server and the communication server routes the voice data to another computer device on the network that converts the voice data in Internet protocol data packets for broadcast to at least one wireless telecommunication device of the group.

7. The system of claim 1, wherein the communication server is configured to map the designated group to a subset of packet data service nodes (PDSNs) within the wireless network based on an expected distribution, within the wireless network, of the wireless communication devices belonging to the designated group, the PDSN subset including at least one PDSN.

8. The system of claim 7, wherein the communication server selects, as an address to be associated with the group communication, an address that is currently available in each PDSN of the PDSN subset.

9. The system of claim 7, wherein each PDSN of the PDSN subset statically maintains itself as a member of the PDSN subset, such that the communication server need not be responsible for updating the membership of the PDSN subset.

10. A communication server for broadcasting Internet protocol data packets containing voice data to a group of wireless telecommunication devices on a wireless network, wherein the communication server receives a single communication stream that is addressed to the communication server from a communicating wireless device and creates a group communication to all wireless telecommunication devices of the designated group, and wherein the server causes the broadcast of Internet protocol data packets containing voice data to at least one wireless telecommunication device of the receiving group of the plurality of wireless telecommunication devices,
    wherein one or more intermediate communication devices bridge communication streams between the communication server and the group of wireless telecommunication devices, and
    wherein the communication server further determines the wireless telecommunication devices of the group able to receive broadcast Internet data protocol packets and directs the one or more intermediate communication devices to send Internet protocol data packets to those wireless telecommunication devices of the group that can receive Internet protocol data packets.

11. The communication server of claim 10, wherein the communication server broadcasts only voice data packets.

12. The communication server of claim 10, wherein the communication server further broadcasts application data.

13. The communication server of claim 10, wherein the communication server further broadcasts multimedia.

14. The communication server of claim 10, wherein the communication server further receives Internet protocol data packets from one or more wireless telecommunication devices on the wireless network.

15. A system for broadcasting Internet protocol data packets containing voice data on a wireless network, comprising:
    means for wireless telecommunication and directing a single communication stream that is addressed to a means for receiving for transmission to a designated group of other wireless telecommunication means on the wireless network, the wireless telecommunication devices further for receiving broadcast Internet protocol data packets containing voice data;
    the means for receiving the single communication stream from a communicating wireless means and creating a group communication to all wireless telecommunication means of the designated group, and wherein the means for receiving further causing the broadcast of Internet protocol data packets containing voice data to the wireless telecommunication means; and means for bridging communication streams between the means for receiving and the wireless communication means, and wherein the means for receiving further determines the wireless telecommunication means of the group able to receive broadcast Internet data protocol packets and direct the means for bridging communication streams to send Internet protocol data packets to those wireless telecommunication means of the group that can receive Internet protocol data packets.

16. A wireless telecommunication device able to direct a single communication stream that is addressed to a communication server for transmission to a designated group of a plurality of wireless telecommunication devices accessible on a wireless network, the wireless telecommunication device further able to receive broadcast Internet protocol data packets containing voice data in addition to communicating through a standard communication stream on the wireless network to other wireless telecommunication devices on the wireless network, wherein one or more intermediate communication devices bridge communication streams between the communication server and the group of wireless telecommunication devices, and wherein the communication server further determines the wireless telecommunication devices of the group able to receive broadcast Internet data protocol packets and directs the one or more intermediate communication devices to send Internet protocol data packets to those wireless telecommunication devices of the group that can receive Internet protocol data packets.

17. The device of claim 16, wherein the wireless telecommunication device further transmits Internet protocol voice data packets to other computer devices on the wireless network.

18. The device of claim 16, wherein the wireless telecommunication device further transmits application data to other computer devices on the wireless network.

19. The device of claim 16, wherein the standard communication stream is a full duplex telephone call across a cellular telecommunication network.

20. The device of claim 16, wherein the standard communication stream is a half duplex telephone call across a cellular telecommunication network to a group of other wireless telecommunication devices.

21. The device of claim 20, wherein the standard communication stream is a push-talk telecommunication.

22. A method for efficiently distributing Internet protocol data packets containing voice data among a group of wireless telecommunication devices on a wireless network, comprising the steps of:

receiving a single communication stream from a communicating wireless device at a communication server, the single communication stream addressed to the communication server for transmission to a designated group of a plurality of wireless telecommunication devices on a wireless network, the communication stream including voice data, and wherein at least one of the plurality of wireless telecommunication devices able to receive Internet protocol data packets containing voice data;

determining at the communication server the wireless telecommunication devices of the group able to receive broadcast Internet data protocol packets;

creating at the communication server a group communication to all wireless telecommunication devices of the designated group; and broadcasting Internet protocol data packets containing voice data to at least one wireless telecommunication device of the receiving group of the plurality of wireless telecommunication devices, the broadcasting step performed by directing the single communication stream from the wireless telecommunication device to one or more intermediate communication devices to send Internet protocol data packets to those wireless telecommunication devices of the group that can receive Internet protocol data packets, the one or more intermediate communication devices bridging communication streams between the communication server and the group of wireless telecommunication devices.

23. The method of claim 22, further comprising the step of receiving the Internet protocol data packets containing voice data at one or more of the plurality of wireless telecommunication devices in the group.

24. The method of claim 22, wherein the step of directing a communication stream includes directing application data to a designated group of a plurality of wireless telecommunication devices.

25. The method of claim 22, wherein the step of directing a communication stream includes directing multimedia to a designated group of a plurality of wireless telecommunication devices.

26. The method of claim 22, further comprising the step of routing the voice data from the communication server to another computer device on the network that converts the voice data in Internet protocol data packets for broadcast to at least one wireless telecommunication device of the group.

27. A method for efficiently distributing Internet protocol data packets containing voice data among a group of wireless telecommunication devices on a wireless network, comprising:

a step for receiving a single communication stream from a communicating wireless device at a communication server, the single communication stream addressed to the communication server for transmission to a designated group of a plurality of wireless telecommunication devices on a wireless network, the communication stream including voice data, and wherein at least one of the plurality of wireless telecommunication devices able to receive Internet protocol data packets containing voice data;

a step for determining at the communication server the wireless telecommunication devices of the group able to receive broadcast Internet data protocol packets;

a step for creating a group communication to all wireless telecommunication devices of the designated group; and a step for broadcasting Internet protocol data packets containing voice data to at least one wireless telecommunication device of the receiving group of the plurality of wireless telecommunication devices, the broadcasting step performed by directing the single communication stream from the wireless telecommunication device to one or more intermediate communication devices to send Internet protocol data packets to those wireless telecommunication devices of the group that can receive Internet protocol data packets, the one or more intermediate communication devices bridging communication streams between the communication server and the group of wireless telecommunication devices.

28. A method for broadcasting Internet protocol data packets containing voice data to a group of wireless telecommunication devices on a wireless network, comprising the steps of:
- receiving a single communication stream at a communication server from a communicating wireless telecommunication device, the single communication stream being addressed to the communication server for transmission to a designated group of wireless telecommunication devices;
- determining at the communication server the wireless telecommunication devices of the group able to receive broadcast Internet data protocol packets;
- creating at the communication server a group communication to each of the wireless telecommunication devices of the designated group of wireless telecommunication devices that are determined to be able to receive broadcast Internet data protocol packets; and
- broadcasting Internet protocol data packets containing voice data from the communication stream to at least one member wireless telecommunication device of the receiving group of the plurality of wireless telecommunication devices, the broadcasting step performed by directing the single communication stream from the wireless telecommunication device to one or more intermediate communication devices to send Internet protocol data packets to those wireless telecommunication devices of the group that can receive Internet protocol data packets, the one or more intermediate communication devices bridging communication streams between the communication server and the group of wireless telecommunication devices.

29. The method of claim 28, wherein the step of broadcasting is broadcasting only voice data packets.

30. The method of claim 28, wherein the step of broadcasting is broadcasting application data.

31. The method of claim 28, wherein the step of broadcasting is broadcasting multimedia.

32. The method of claim 28, wherein the step of receiving a communication stream is receiving Internet protocol data packets from one or more wireless telecommunication devices on the wireless network.

33. A method for broadcasting Internet protocol data packets containing voice data to a group of wireless telecommunication devices on a wireless network, comprising:
- a step for receiving a single communication stream at a communication server from a communicating wireless telecommunication device, the single communication stream being addressed to the communication server for transmission to a designated group of wireless telecommunication devices;
- a step for determining at the communication server the wireless telecommunication devices of the group able to receive broadcast Internet data protocol packets;
- a step for creating a group communication to each of the wireless telecommunication devices of the designated group of wireless telecommunication devices that are determined to be able to receive broadcast Internet data protocol packets; and
- a step for broadcasting Internet protocol data packets containing voice data to at least one wireless telecommunication device of the receiving group of the plurality of wireless telecommunication devices, the broadcasting step performed by directing the single communication stream from the wireless telecommunication device to one or more intermediate communication devices to send Internet protocol data packets to those wireless telecommunication devices of the group that can receive Internet protocol data packets, the one or more intermediate communication devices bridging communication streams between the communication server and the group of wireless telecommunication devices.

34. A computer-readable storage medium including instructions stored thereon, that when executed by a computer, cause the computer to perform the steps of:
- receiving a single communication stream at a communication server from a communicating wireless telecommunication device, the single communication stream being addressed to the communication server for transmission to a designated group of wireless telecommunication devices;
- determining at the communication server the wireless telecommunication devices of the group able to receive broadcast Internet data protocol packets;
- creating at the communication server a group communication to each of the wireless telecommunication devices of the designated group of wireless telecommunication devices that are determined to be able to receive broadcast Internet data protocol packets; and
- broadcasting Internet protocol data packets containing voice data from the communication stream to at least one member wireless telecommunication device of the receiving group of the plurality of wireless telecommunication devices, the broadcasting step performed by directing the single communication stream from the wireless telecommunication device to one or more intermediate communication devices to send Internet protocol data packets to those wireless telecommunication devices of the group that can receive Internet protocol data packets, the one or more intermediate communication devices bridging communication streams between the communication server and the group of wireless telecommunication devices.

35. The program of claim 34, wherein the program further causes the step of broadcasting to be broadcasting only voice data packets.

36. The program of claim 34, wherein the program further causes the step of broadcasting to be broadcasting application data.

37. The program of claim 34, wherein the program further causes the step of broadcasting to be broadcasting multimedia.

38. The program of claim 34, wherein the program further causes the step of receiving a communication stream to be receiving Internet protocol data packets from one or more wireless telecommunication devices on the wireless network.

* * * * *

UNITED STATES PATENT AND TRADEMARK OFFICE
CERTIFICATE OF CORRECTION

| | | |
|---|---|---|
| PATENT NO. | : 7,724,743 B2 | |
| APPLICATION NO. | : 11/097044 | |
| DATED | : May 25, 2010 | |
| INVENTOR(S) | : Razdan et al. | |

It is certified that error appears in the above-identified patent and that said Letters Patent is hereby corrected as shown below:

Title page, Item (54) and Col. 1, Line 3, Title: "AMOUNG" to read as --AMONG--

Signed and Sealed this
Twenty-fourth Day of July, 2012

David J. Kappos
*Director of the United States Patent and Trademark Office*